(12) United States Patent
Kankaanpää

(10) Patent No.: US 7,318,880 B2
(45) Date of Patent: Jan. 15, 2008

(54) METHOD FOR DEFIBRING RECYCLED FIBER MATERIAL IN A DRUM PULPER, AND A DRUM PULPER

(75) Inventor: Veikko Kankaanpää, Valkeakoski (FI)

(73) Assignee: Metso Paper Inc., Helsinki (FI)

( * ) Notice: Subject to any disclaimer, the term of this patent is extended or adjusted under 35 U.S.C. 154(b) by 513 days.

(21) Appl. No.: 10/505,838

(22) PCT Filed: Mar. 24, 2003

(86) PCT No.: PCT/FI03/00223

§ 371 (c)(1),
(2), (4) Date: Aug. 26, 2004

(87) PCT Pub. No.: WO03/080923

PCT Pub. Date: Oct. 2, 2003

(65) Prior Publication Data

US 2005/0103453 A1    May 19, 2005

(30) Foreign Application Priority Data

Mar. 25, 2002 (FI) .................................. 20020568

(51) Int. Cl.
*D21C 7/14* (2006.01)

(52) U.S. Cl. .............................. 162/49; 162/4; 162/20; 162/198; 162/254; 241/28; 241/74

(58) Field of Classification Search .................... 162/4, 162/20, 49, 198, 254; 241/28, 74, 46.17, 241/152 R, 101 B
See application file for complete search history.

(56) References Cited

U.S. PATENT DOCUMENTS

| 4,385,997 A | 5/1983 | Stradal |
| 2001/0006098 A1 | 7/2001 | Dockal-Baur et al. |

FOREIGN PATENT DOCUMENTS

GB    1 525 947    9/1978

OTHER PUBLICATIONS

International Search Report for PCT/FI03/00223 completed May 27, 2003.
Official Action issued Finnish Priority Appl. No. 20020568 dated Sep. 4, 2002.

*Primary Examiner*—Mark Halpern
(74) *Attorney, Agent, or Firm*—Alston & Bird LLP

(57) ABSTRACT

The invention relates to a method for defibering recycled fiber material in a drum pulper provided with a substantially horizontal drum. Recycled fiber material and water are fed to the drum pulper and the drum of the drum pulper is simultaneously rotated. When the drum rotates, the recycled fiber material rises up in the rotating drum and finally, due to gravitational force, falls back down. After falling and hitting to the bottom, the recycled fiber material is defibered, forming a fiber pulp mixture with water. A value of at least one parameter describing the defibration process or fiber pulp properties is measured on the basis of the drum pulper or the resultant fiber pulp mixture, and this value is used for controlling the rotation speed of the drum of the drum pulper. The invention also relates to a drum pulper implementing the method of the invention.

8 Claims, 2 Drawing Sheets

Power taken by drum pulper motor vs. rotation speed with two different raw materials

METHOD FOR DEFIBRING RECYCLED FIBER MATERIAL IN A DRUM PULPER, AND A DRUM PULPER This application is a 371 of PCT/FI03/00223 filed 24 Mar. 2003.

FIELD OF THE INVENTION

The invention relates to a method for defibering recycled fiber material in a drum pulper provided with a substantially horizontal drum, the method comprising feeding recycled fiber material and water to the drum pulper and simultaneously rotating the drum of the drum pulper, whereby the recycled fiber material rises up in the rotating drum and finally, due to gravitational force, falls back down, whereupon, after falling and hitting to the bottom, it is defibered, thus forming a fiber pulp mixture with water, and measuring a value of at least one parameter describing the defibration process or fiber pulp properties on the basis of the drum pulper or the resultant fiber pulp mixture, and by controlling the rotation speed of the drum of the drum pulper on the basis of said parameter value.

The invention also relates to a drum pulper, which comprises a substantially horizontal drum rotatably mounted around a substantially horizontal axis, to which drum recycled fiber material is fed to defiber it, a pit below the drum for a fiber pulp mixture which is formed of the recycled fiber material supplied to the drum pulper in the defibration and water, means for removing the fiber pulp mixture from the pit of the drum pulper, and a motor for rotating the drum, and it comprises at least one measuring means for measuring a value of at least one parameter describing the defibration process or fiber pulp properties on the basis of the drum pulper or the resultant fiber pulp mixture and that it comprises control means for controlling the rotation speed of the drum of the drum pulper on the basis of said parameter value.

BACKGROUND OF THE INVENTION

In drum pulpers, recycled fiber material is defibered to fiber pulp. The process is carried out so that a pulper drum rotates substantially horizontally or in a position slightly inclined from the material feed end to the exit end and material to be defibered rises up in the rotating drum and at some point, falls down to the bottom and is defibered. The size and rotation speed of the pulper drum are designed according to the pulper capacity so that material fed to one end of the drum would be defibered as well as possible when it reaches the exit end. Current drum pulpers do not have actual controls, and the only typical variables are chemicals used and the amount thereof as well as consistency of pulp to be pulped, which is a constant value regarded as suitable for the pulper and the pulp type.

The aim of drum pulping is to separate fibers from each other as well as possible, thereby keeping the size of different impurities, such as plastic, glues etc., as large as possible to facilitate their separation from fiber pulp. By using current drum pulper solutions, however, it is not possible to optimize the process in practice.

BRIEF DESCRIPTION OF THE INVENTION

It is an object of the present invention to provide such a method for defibering recycled fiber material in a drum pulper that the defibration process can be controlled and, if desired, optimized according to a desired parameter. Furthermore, it is an object of the present invention to provide a drum pulper, by which a defibration process can be controlled.

The method of the invention is characterized by measuring at least the power taken by a motor of the drum pulper and by controlling the rotation speed of the drum of the drum pulper on the basis of the measured power value.

The drum pulper of the invention is characterized in that at least one measuring means is arranged to measure the power taken by the motor of the drum pulper and that the control means are arranged to control the rotation speed of the drum of the drum pulper on the basis of the measured power value.

The essential idea of the invention is that the rotation speed of the drum pulper is controlled on the basis of a predetermined, measurable parameter. According to the essential idea of a preferred embodiment of the invention, the rotation speed of the drum pulper is increased, until the power taken by the motor of the drum pulper starts to decrease, whereby the found maximum point of power consumption is regained by reducing the rotation speed. According to a second preferred embodiment of the invention, the rotation speed of the drum pulper is controlled on the basis of its specific energy consumption SEC. According to a third preferred embodiment of the invention, the rotation speed of the drum pulper is controlled so that the specific energy consumption can be kept as high as possible during the defibration.

The invention provides the advantage that defibration can be controlled and adjusted so that a desired process result and desired defibration of recycled material are achieved. By controlling the rotation speed on the basis of specific energy consumption, defibration can be controlled by taking into account how much energy is consumed in the defibration for a certain amount of defibered material. Especially when specific energy consumption is used as a parameter value in the defibration such that as large an amount of specific energy as possible is used per one defibered material unit, the defibration is carried out in the most efficient way.

BRIEF DESCRIPTION OF THE DRAWINGS

The invention will be described in greater detail in the attached drawings, in which FIG. 1 schematically shows a partially sectional side view of a drum pulper of the invention, and its control devices, FIG. 2 schematically shows a cross section of the drum pulper of FIG. 1, taken along the line A-A of FIG. 1, and FIG. 3 schematically illustrates specific energy consumption of a drum pulper as a function of pulp flow defibered therein and of rotation speed, when two different raw materials are used.

DETAILED DESCRIPTION OF THE INVENTION

Figure 1:
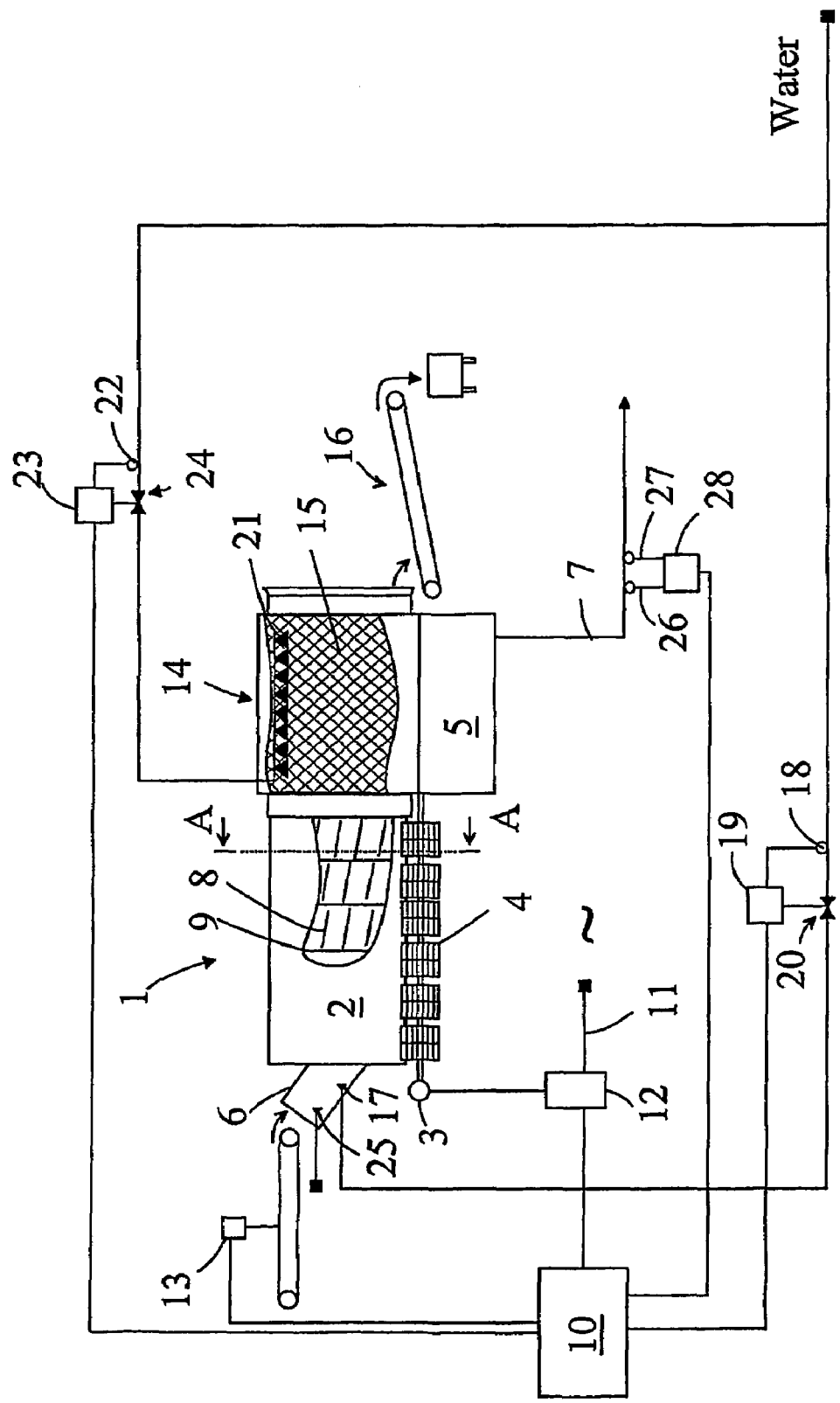

FIG. 1 shows a drum pulper 1 of the invention, comprising a rotating drum 2. The drum 2 is rotated by a motor 3 using transmission equipment 4. Below the drum 2 there is a pit 5. Recycled material to be processed is fed into the drum 2 of the drum pulper 1 via a feed channel 6 and the finished pulp is removed from the drum pulper via a discharge channel 7 at the other end. Recycled material, such as papers, cardboard or other recyclable material and water, is fed to the drum pulper 1 in order to be pulped. Recycled material can be fed to the pulper either as continuous feeding or in batches. The drum 2 is rotated by the motor 3, and protrusions 8 on the inner surface of the drum 2 convey the material to be pulped upwards in the drum, until the material falls back down and, after falling and hitting the bottom, is defibered more and more each time it falls down, until it forms a fiber pulp suspension with water while exiting from the drum at the other end of the drum 2. Part of the defibration is caused by the rubbing of fibers against each other when the recycled material is rotated in the drum pulper. To convey the material to be pulped along the drum in its axial direction from the feed end to the exit end, the drum 2 can be provided with slanting rail-like or shorter blade-like protrusions 8, which are known per se and aim at transferring the material to the exit end when the drum 2 is rotating. Correspondingly, the drum 2 can be pivoted in a manner known per se to be slightly inclined so that after the material has risen up on the surface of the drum, it falls a distance forwards axially to the drum. Inside the drum, in its cross-direction, there are annular spacer plates 9 around the inner surface of the drum, which prevent the fed pulp and water from flowing too fast through the drum 2. The pass-through time and processing time of pulp can be adjusted by the structure and inclination angle of the inner parts of the drum.

The drum pulper of FIG. 1 also comprises a control unit 10, which controls the operation of the drum pulper. The electricity required for the motor is fed connected to control the frequency converter 12. The control unit 10 is further connected to measure electric power, i.e. used energy, fed to the motor 3. The drum pulper also comprises measuring means 13 for continuously measuring the amount, or mass, of recycled fiber material to be fed to the drum pulper 1. At the same time, the amount of water to be fed to the pulper is also measured with one or more flow meters. Water is fed to the forward end of the drum pulper preferably via the feed channel 6. At the drum pulper's forward end, where material to be defibered is still solid and possibly stuck together as compact bales, the material does not have a clear material surface. At a later stage of defibration, the material is formed to pulp, which is more uniform and the surface of which can be somehow defined.

At the forward end of the drum 2, the drum cover is made of a solid material, and pulp to be defibered and water remain inside the drum. In the embodiment of FIG. 1, the rear end of the drum 2 comprises a screening stage 14 known per se, under which there is a pit 5. The screening stage 14 is provided with a screen cylinder 15 in a manner known per se, comprising gaps or openings, through which the accepted fibers and water can pass to the pit 5 below, thus forming a fiber pulp suspension. The part of the recycled fiber material and other material conveyed with it that is not passed through the screen cylinder is finally transferred after the screening stage out of the end of the drum 2 to a separate conveyor 16, for instance, to be removed from the process. Instead of the conveyor 16, there can also be a separate reject pit or a transport carriage or other corresponding solution.

In the case of FIG. 1, water is fed to the drum pulper by means of a nozzle 17 firstly to the feed channel 6. The flow rate of water is measured with a measuring sensor 18, which is connected to the control unit 10 via a separate measuring and control unit 19. The measuring and control unit 19, for its part, is connected to control a water feed valve 20, by which the amount of water to be fed to the drum 2 is controlled. Water is also fed by water jets 21 to the screening stage 14, in which the water jets clean the screen cylinder by removing fibers or other materials possibly stuck to the gaps or openings of the screen cylinder and flushes the accepted fibers to the pit 5. The flow rate of water is measured correspondingly with a measuring device 22, which is connected to the control unit 10 via a second measuring and control unit 23. The second measuring and control unit 23, for its part, is connected to control a second water feed valve 24, by which the amount of water to be fed to the screening stage 14 is controlled. Via a nozzle 25, the required amount of chemicals possibly needed for defibration can also be fed to the feed channel 6. The control unit 10 receives the measured values from different sensors and/or the measuring and control units and controls the process correspondingly on the basis of the measured values.

According to the invention, the rotation speed of the drum 2 of the drum pulper is controlled by measuring the mass of the recycled fiber material to be fed in a time unit and another parameter relating to drum pulping or resulting from drum pulping and by controlling the rotation speed of the motor 3 on the basis of said parameter so that a desired defibration result is achieved. For instance, a point at which the intensity, i.e. the processing power is at its highest is searched for the rotation speed of the drum pulper. Simultaneously fuzzy logic seeks the dependence between the intensity and the rotation speed. After the dependence is detected, the processing power is managed and a desired intensity is selected, the intensity preferably being 70 to 100% of the maximum power taken by the motor 3 during the operation. By using this programming principle, a rotation speed corresponding to the highest power can be searched again when recycled fiber materials and process circumstances change. The processing power can be measured with power of the motor 3, torque of the drum or by using the measured energy consumption, which are variables directly proportional to each other. Process circumstances can be considered to change when the pulp flow through the drum pulper weakens or increases or when the amount of material rotating in the drum pulper changes substantially or when the frictional properties of the material change owing to a change in consistency, temperature, chemicals or raw material, for instance. In the case of FIG. 1, the parameter used is specific energy consumption per one defibered unit of recycled fiber material (SEC), which is obtained by dividing the power fed to the motor 3 by the mass of the recycled fiber material fed to the pulper and passed through it. When this parameter is used, it is easy to implement the control, because, in practice, it can be carried out entirely as an online measurement.

On the basis of experiments conducted, when SEC control is used, an optimal implementation is such that the specific energy consumption per a mass unit is as high as possible. With these controls, the rotation speed of the drum 2 and, correspondingly, the rotation speed of the motor 3 in a certain drum pulper have specific, substantially constant maximum values, when the same materials and the same pulp flow are employed.

Other applicable parameters may include a screening ratio, i.e. a ratio between an accept and a reject, which is formed in the next screening stage of the fiber pulp mixture exiting from the drum pulper 1 and obtained by measuring, in the embodiment of FIG. 1, the flow rate and consistency of the accept flowing out of the discharge channel 7 with measuring devices 26 and 27, which are connected via a third measuring and control unit 28 to the control unit 10. A reject ratio is obtained by subtracting the obtained values from the pulp flow fed to the drum pulper, on the basis of which either a reject ratio or an accept ratio can be calculated. By using this information, the control unit 10 can calculate the screening ratio and use it for controlling the rotation speed of the drum 2. If desired, SEC control and screening ratio control can be used at the same time.

Figure 2:
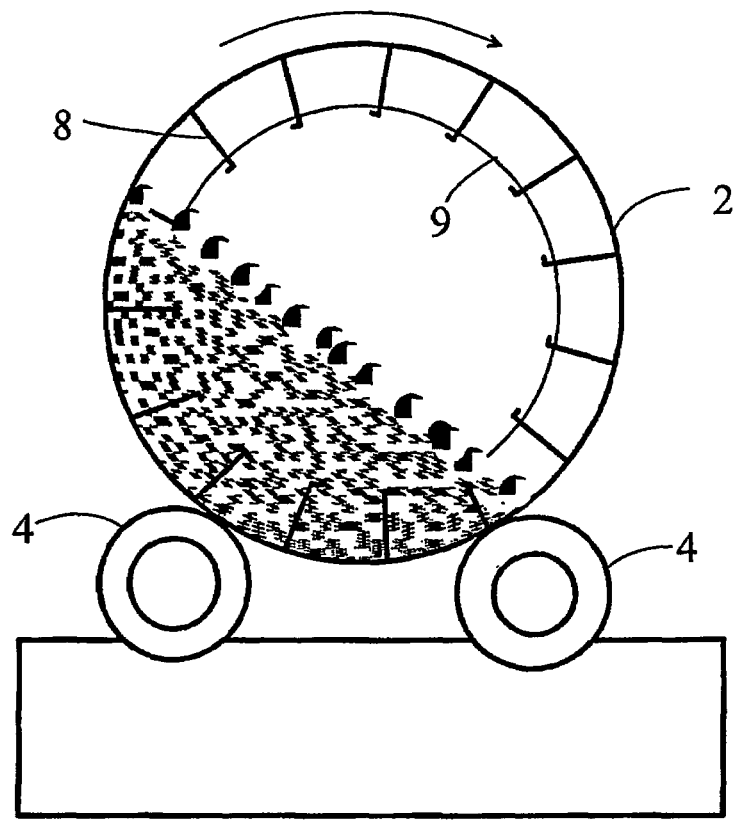

FIG. 2 shows a cross section of an embodiment of the drum pulper of the invention schematically, seen from the end of the drum. It shows schematically a drum 2, which is supported on typically several successive wheels of transmission elements 4. The transmission elements 4 are rotated by one or more motors, which are not shown. Inside the drum 2 there are blade-like protrusions 8, by which material is transferred when the drum is rotating, such that after the material has risen up, it falls down and, as a result of an energy pulse caused by the hit to the bottom, it is defibered. Typically, the filling degree of a drum pulper is about 30% of the cross-sectional area, in which case the material to be defibered can be conveyed sufficiently freely with the blades and fall down. As a result of rotation, the material to be defibered is settled at the end section of the drum in practice so that its surface is at an angle of approximately 45° C. but it can naturally vary greatly, depending on the rotation speed of the drum. By way of example, the material to be defibered falls downward at a point of approximately 11 to 11:30 o'clock when the drum rotates clockwise, i.e. approximately 5 to 15° before the highest point. This falling point naturally depends on raw material, consistency, rotation speed and elements controlling the fiber flow and is thus not strictly limited to a specific point during the rotation of the drum. The blades 8 of FIG. 2 show one embodiment, but they may vary in many ways, depending on applications. As a physically effective quantity, the controlling of rotation speed of a drum pulper means that the circumferential speed of the drum must be changed. The circumferential speed which is produced in the pulp suspension and is in proportion to the circumferential speed of the drum determines the centrifugal force affecting the suspension and forcing the suspension outwards in the direction of the drum radius. The pulp suspension is simultaneously affected by gravitational force, which aims at dropping the suspension down to the bottom of the drum. The falling point of the pulp in the drum is also affected by these forces.

Figure 3:
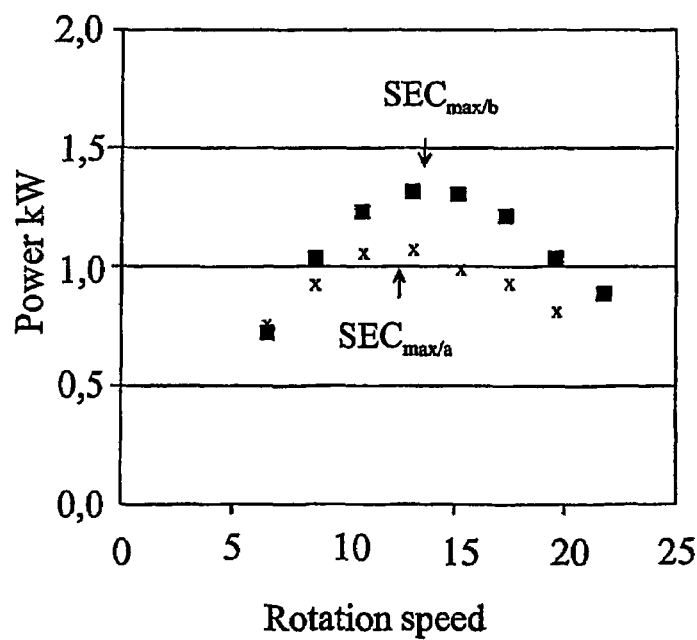

FIG. 3 schematically illustrates the ratio of specific energy consumption to the rotation speed of a drum in a drum pulper with a diameter of 2.0 meters, when certain pulp flow of recycled fiber material and two different raw materials are used. As FIG. 3 shows, the specific energy consumption increases until a certain rotation speed is achieved, after which it starts to decrease. By using SEC control, the purpose is to achieve a state where the specific energy consumption is as high as possible, i.e. where the rotation speeds denoted by arrows $SEC_{max}/a$ and $SEC_{max}/b$, respectively, of FIG. 3 are achieved. Since the structure and other properties, such as mass and practically also feed rate of the recycled fiber material vary, the rotation speed cannot be fixed to this value but is controlled continuously or periodically on the basis of measurement results such that the specific energy consumption is as high as possible.

In the above specification and drawings, the invention is only described by way of example and is not restricted thereto in any way. Various technologies known per se can be employed for controlling a drum pulper and measuring and adjusting parameters and other values. Therefore, instead of a separate control unit, various decentralized technologies, a computer controlling a larger process etc. can be used. Accordingly, measuring devices and sensors can be connected directly to the control unit or the like without separate measuring and control units. What is essential is that the rotation speed of the drum of the drum pulper is controlled by means of a parameter relating to pulping or to the formed fiber pulp mixture so that a desired pulping result, i.e. a defibration result is achieved.

The invention claimed is:

1. A method for defibering recycled fiber material in a drum pulper provided with a substantially horizontal drum, the method comprising:
    feeding recycled fiber material and water into the drum and simultaneously rotating the drum of the drum pulper, whereby the recycled fiber material rises up in the rotating drum and then, due to gravitational force, falls back down in the rotating drum, the recycled fiber material being defibered upon falling and hitting the drum, thus forming a fiber pulp mixture with the water in a defibration process;
    measuring at least one parameter associated with at least one of the drum pulper and the fiber pulp mixture, the at least one parameter comprising at least a processing power consumed by a motor configured to rotate the drum; and
    controlling a rotation speed of the drum of the drum pulper in response to at least the measured processing power consumed by the motor.

2. A method as claimed in claim 1, wherein measuring at least one parameter further comprises additionally measuring a fiber pulp flow through the drum pulper, and controlling a rotation speed of the drum further comprises additionally controlling the rotation speed of the drum in response to the measured fiber pulp flow.

3. A method as claimed in claim 1, wherein controlling a rotation speed of the drum further comprises controlling the rotation speed of the drum so that the processing power consumption of the motor is between about 70% and about 100% of a maximum processing power during the defibration process.

4. A method as claimed in claim 1, wherein controlling a rotation speed of the drum further comprises controlling the rotation speed of the drum so that the processing power consumption of the motor is maximized during the defibration process.

5. A method as claimed in claim 3, wherein parameters, other than the rotation speed of the drum, affecting the processing power consumption of the motor remain substantially unchanged during the defibration process.

6. A method as claimed in claim 3, wherein a fiber pulp flow through the drum pulper is substantially constant during the defibration process.

7. A method as claimed in claim 1, wherein measuring at least one parameter further comprises measuring the processing power consumed by the motor for rotating the drum and a fiber pulp flow through the drum pulper, and calculating a specific energy consumption of defibration per defibered unit of recycled fiber material from the measured processing power consumption and the measured fiber pulp flow, and controlling a rotation speed of the drum further comprises controlling the rotation speed of the drum in response to the calculated specific energy consumption.

8. A method as claimed in claim 7, wherein controlling a rotation speed of the drum further comprises controlling the rotation speed of the drum so that the specific energy consumption is maximized during the defibration process.

* * * * *